United States Patent [19]

Garrett

[11] Patent Number: 4,598,192
[45] Date of Patent: Jul. 1, 1986

[54] ELECTRICALLY HEATED HANDLE FOR FISHING RODS

[76] Inventor: John E. Garrett, 805 N. Summerfield Dr., Madison, Tenn. 37115

[21] Appl. No.: 750,233

[22] Filed: Jun. 28, 1985

Related U.S. Application Data

[63] Continuation-in-part of Ser. No. 585,839, Mar. 2, 1984, abandoned.

[51] Int. Cl.⁴ .................. H05B 3/00; A01K 87/00; A01K 97/00
[52] U.S. Cl. ........................ 219/201; 43/23; 74/543; 126/204; 126/208; 219/204; 219/240; 219/520; 219/534
[58] Field of Search .............. 219/200, 201, 204, 520, 219/534, 240; 74/543; 280/816, 819; 43/23; 126/204, 206, 208; 338/241, 243

[56] References Cited

U.S. PATENT DOCUMENTS

| | | | |
|---|---|---|---|
| Re. 24,858 | 8/1960 | Phipps | 126/208 |
| 744,739 | 11/1903 | Fliess | 219/204 |
| 1,276,930 | 8/1918 | Kemper et al. | 219/204 |
| 1,865,834 | 7/1932 | Claridge | 219/204 |
| 2,001,343 | 5/1935 | Fehre | 219/204 |
| 2,014,677 | 9/1935 | Williams | 219/534 |
| 2,069,348 | 2/1937 | Young | 338/241 |
| 2,081,053 | 5/1937 | Hobson | 74/543 |
| 2,448,669 | 9/1948 | Green | 219/534 |
| 2,616,202 | 11/1952 | Romberger | 43/17 |
| 2,816,539 | 12/1957 | Church | 126/208 |
| 2,835,245 | 5/1958 | Morgan | 126/208 |
| 2,995,853 | 8/1961 | Ohliger | 43/17 |
| 2,997,042 | 8/1961 | Mitchell | 126/208 |
| 3,022,408 | 2/1962 | Wagner | 219/201 |
| 3,164,921 | 1/1965 | Mavrakis | 43/24 |
| 3,379,854 | 4/1968 | Jovis | 219/201 |
| 3,667,315 | 6/1972 | Polly | 219/204 X |
| 3,858,567 | 1/1975 | Slogaski | 126/206 |
| 4,020,825 | 5/1977 | Fusetti | 126/206 |

FOREIGN PATENT DOCUMENTS 601355  7/1960  Canada ........................ 219/201

Primary Examiner—A. Bartis
Attorney, Agent, or Firm—Harrington A. Lackey

[57] ABSTRACT

An electrically heated handle, particularly for fishing rods, has an elongated thermally conductive shell enclosing an interior chamber in which is located a solid body of a material having high electrical resistance, such as Steatite, defining a heater core having its entire outer surface in heat transfer engagement with the shell. An elongated electric heating coil, e.g., of Nichrome, extends longitudinally through the interior of the heater core and is connected to an external power source through a switch and power supply conductors extending through the rear end portion of the handle. The front end portion of the handle is formed with an elongated socket chamber thermally insulated from the interior chamber and adapted to receive and fit over the butt end of a fishing rod. Once the heater core of the handle is initially heated, the heat is stored for slow dissipation to the handle and hand of the holder, requiring infrequent replenishing of electric current to the electric heating coil. The electrically heated handle may be modified for connection to the handle of a electric trolling motor. The switch may be mounted in the handle or formed as a separate external unit detachably connected to the handle by a separable connector plug, and may be a manual off-on switch, timer or thermostat.

3 Claims, 9 Drawing Figures

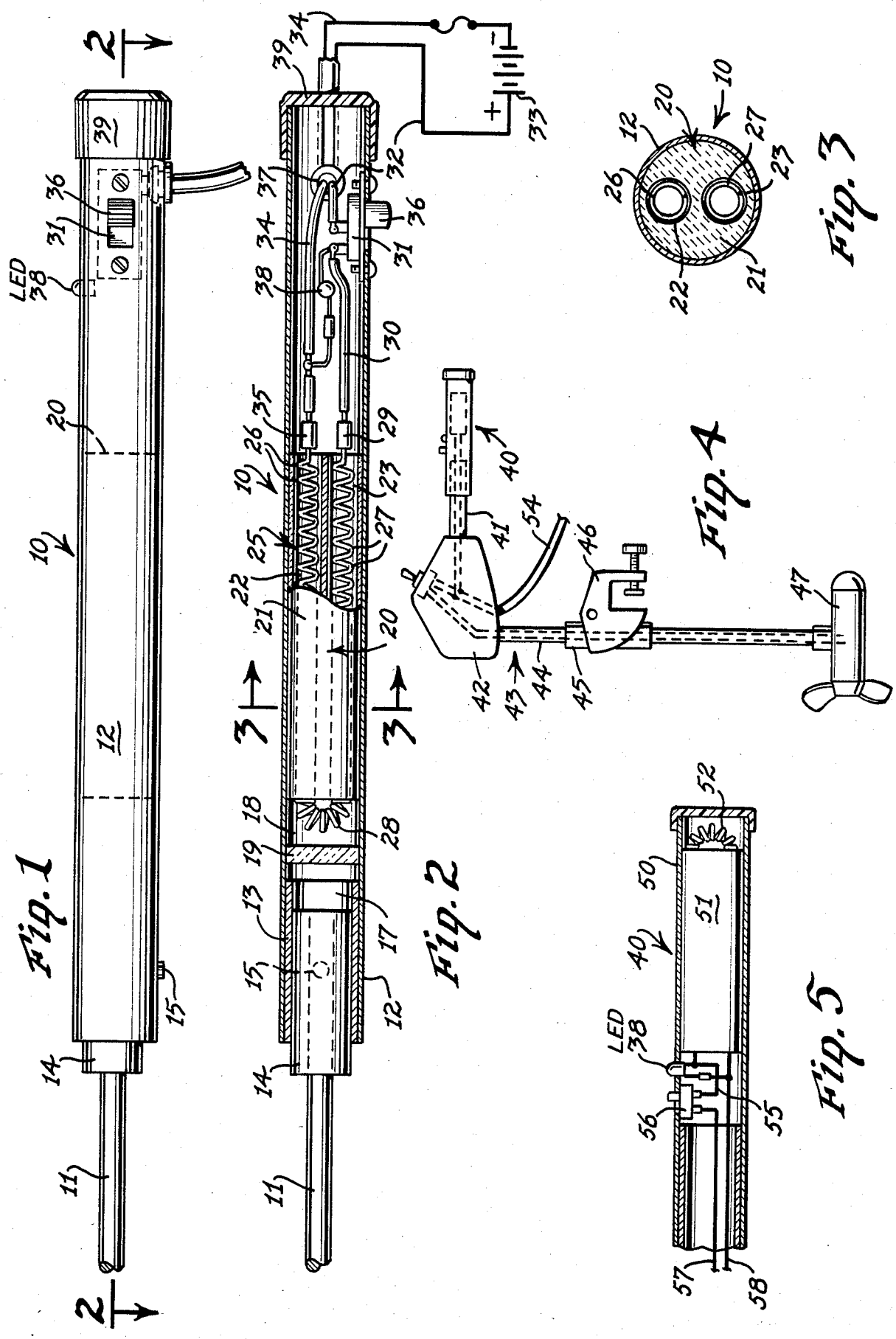

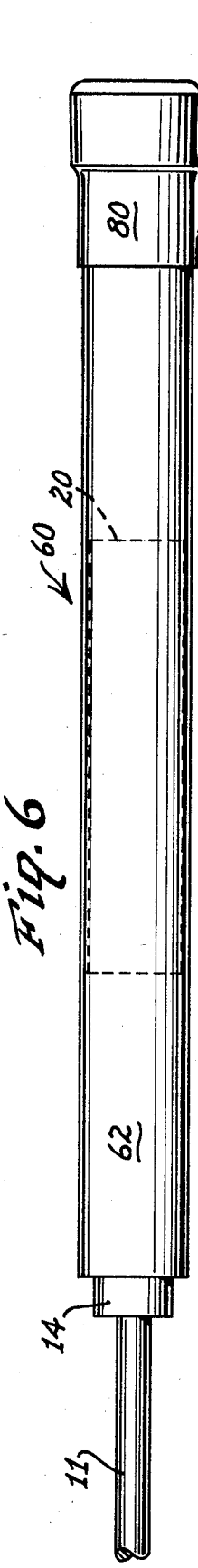
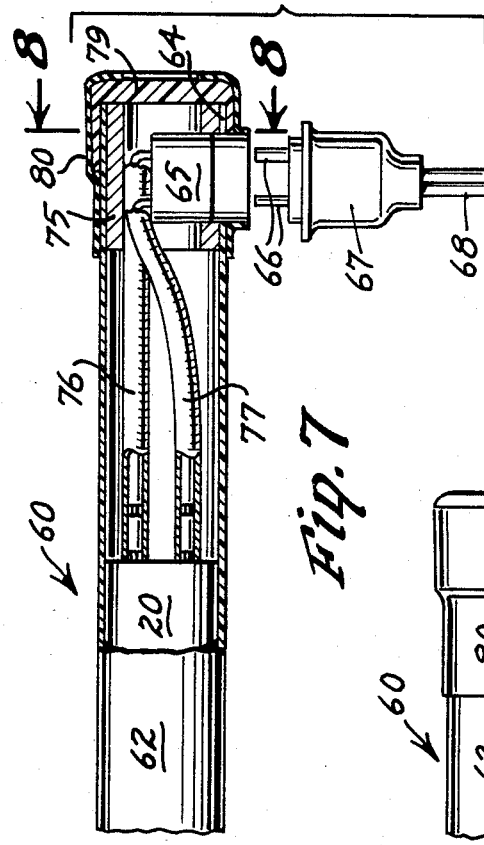
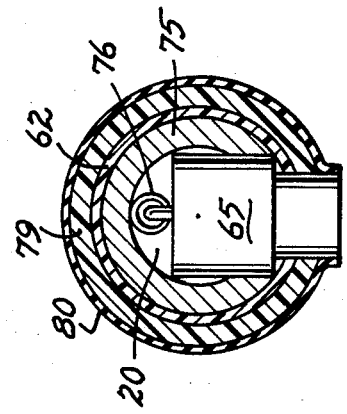
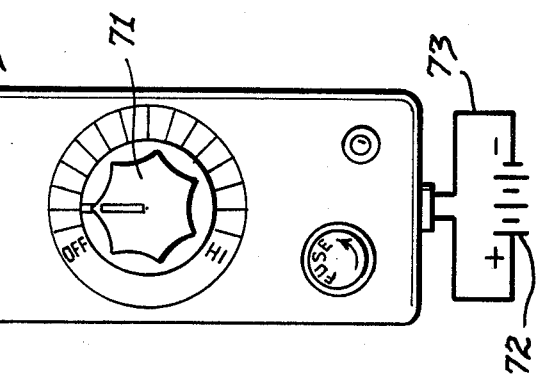

ELECTRICALLY HEATED HANDLE FOR FISHING RODS

Cross-Reference to Related Application

This application is a continuation-in-part of application Ser. No. 585,839, filed Mar. 2, 1984, now abandoned.

BACKGROUND OF THE INVENTION

This invention relates to electrically heated handles, and more particularly to electrically heated handles for use on a fishing rod or trolling motor.

Heated handles for fishing rods are known in the art, but these fishing rod handles have included heating elements in which the heat is produced by chemical reaction or combustion. Examples of such chemically heated fishing rod handles are disclosed in the following U.S. Pat. Nos.: 2,815,639 Church Dec. 17, 1957; 2,835,245 Morgan May 20, 1958; RE. 24,858 Phipps Aug. 9, 1960; 2,997,042 Mitchell Aug. 22, 1961; 3,858,567 Slogaski Jan. 7, 1975; 4,020,825 Fusetti May 3, 1977.

Although fishing rod handles heated by chemical reaction or a combustion process produce quick and effective heat, as well as providing a source of heat which can be totally contained within the handle, nevertheless, such heated handles are subjected to deficiencies created by the environment, particularly wind and moisture. Fishing rod handles heated by chemicals or combustion require oxygen. Since the only convenient and inexpensive source of oxygen is the ambient atmosphere, by necessity the handles must be provided with draft holes to permit the air to enter the handle and support the combustion or chemical reaction within the handle. In inclement weather, wind and/or moisture in the form of rain, snow, or fog, easily penetrate the draft holes and reduce or extinguish the chemical or combustion reaction.

Even in fair weather and still air, water from boat spray can enter the draft holes of a chemically heated fishing rod handle.

Moreover, the draft for supporting the chemical reaction or combustion of the heated fishing rod handle is difficult to regulate or control, even though mechanical means may be provided for enlarging or reducing the size of the draft holes, because of the changes in wind velocity or direction on a windy day, and the changes in direction of the fishing boat.

Electrically energized, illuminated fishing rods are known as shown in the following U.S. Pat. Nos.: 2,616,202 Romberger Nov. 4, 1952 2,995,853 Ohliger Aug. 15, 1961.

The Mavrakis U.S. Pat. No. 3,164,921 discloses a "Heated Fishing Rod: in which the fishing line is electrically heated through electrically conductive line guides.

The Jovis U.S. Pat. No. 3,379,854 discloses the electrically heated handle of a motor vehicle key in which electrical power is supplied by a conductor from the storage battery of the vehicle.

The Fliess U.S. Pat. No. 744,739 issued Nov. 24, 1903, discloses an "Electrically Heated Handle" for outdoor use in cold weather. However, the Fliess handle was particularly adapted for use as a handle on the steering or speed-controlling levers of horseless carriages. But more importantly, the Fliess patent discloses a hollow conductive shell or cover containing an insulator core body in which the electrical heat conductor wires are wound on the outside of the insulator core and in heat transmitting relationship with the conductive shell or cover. Moreover, Fliess emphasizes that the exterior surface of the insulator body is rendered heat reflective by glazing or polishing so that practically all of the heat from the electrical conductors is radiated outwardly into and through the handle cover, and very little of the heat is stored. In the Fliess handle, electrical current must be supplied to the conductors, either continuously, or with rapid interruptions. Once the current is turned off, all of the heat is rapidly radiated and must be re-supplied rather promptly, since practically none of the heat is stored.

SUMMARY OF THE INVENTION

It is therefore an object of this invention to provide an electrically heated handle, particularly adapted for a fishing rod or a trolling motor in which, once the core of the handle is initially heated, the heat is stored for slow dissipation to the handle and the hand of the holder, requiring infrequent replenishing of electrical current to the heating core.

Furthermore, a handle, particularly for a fishing rod, or for other outdoor use, has been provided which is not affected by the vicissitudes of the weather, climate or environment. The only additional equipment needed for the operation of the fishing rod handle or trolling motor handle made in accordance with this invention is an electrical storage battery or other source of electrical voltage. However, an electrical storage battery is already part of the existing equipment on most motor boats, and particularly a boat provided with an electrical trolling motor.

The electrically heated handle made in accordance with this invention includes an elongated exterior shell of electrically conductive material enclosing an interior chamber containing an elongated insulator body preferably in heat transfer engagement with the shell. Contained within the insulator body is an elongated electrical heating coil. The coil is connected through a conductor and switch to an external source of electrical voltage, such as a storage battery.

By virtue of the inclusion of the electrically conductive heating coil within the insulator body, the heat generated by the passing of the current through the heating coil is conducted into the insulator body slowly, because of the low thermal conductivity of the insulator body. However, once the insulator body is heated, the current may be removed from the heating coil for long periods of time without replenishment. The heat which is stored within the insulator body is gradually released from the insulator body through the conductive shell preferably in contact with the insulator body.

BRIEF DESCRIPTION OF THE DRAWINGS

FIG. 1 is a side elevational view of an electrically heated fishing rod handle made in accordance with this invention;

FIG. 2 is a section taken along the line 2—2 of FIG. 1, with the electrical voltage source shown schematically, and with portions of the heating core partially broken away;

FIG. 3 is an enlarged section taken along the line 3—3 of FIG. 2;

FIG. 4 is a side elevational view of a modification of the invention in the form of an electrically heated trolling motor handle;

FIG. 5 is an enlarged fragmentary sectional view of the trolling motor handle disclosed in FIG. 4.

FIG. 6 is a side elevational view of a modified electrically heated fishing rod handle made in accordance with this invention;

FIG. 7 is a fragmentary side elevational view of the butt end portion of the handle member disclosed in FIG. 6, with portions broken away, showing the electrical connectors detached;

FIG. 8 is an enlarged secion taken along the line 8—8 of FIG. 7; and

FIG. 9 is a fragmentary side elevational view of the butt end portion of the handle member disclosed in FIG. 6, with a different type of external switch.

DESCRIPTION OF THE PREFERRED EMBODIMENT

Referring now to the drawings in more detail, FIGS. 1–3 disclose an electrically heated fishing rod handle 10 made in accordance with this invention, fitted upon a fishing rod 11.

The fishing rod handle 10 includes an elongated hollow tubular shell or housing 12 made of an electrically conductive material, such as aluminum.

The front end portion of the shell 12 is open to receive a cylindrical bushing 13, which in turn tightly receives a cylindrical ferrule 14, which is fitted over the butt end of the fishing rod 11. The bushing 13 is preferably secured to the interior of the shell 12 by means of the set screw 15. The bushing 13 may be made of a semi-hard plastic material having a high coefficient of friction for snugly receiving the ferrule 14, also made of a material having a high coefficient of friction. It will be understaood of course, that various means may be utilized for fitting or mounting the handle 10 upon the fishing rod 11, without departing from the scope of this invention.

The front end portion of the fishing rod handle 10, or socket chamber 17, for receiving the bushing 13, ferrule 14 and fishing rod 11, is separated from the interior heating chamber 18 by means of an insulated partition wall 19.

Received within the heating chamber 18 is an elongated, preferably cylindrical, heating core 20. The heating core 20 is preferably an elongated cylindrical solid insulator body 21 made of an electrically insulating material such as Steatite, having a relatively high electrical resistance. A pair of elongated passages 22 and 23 extend longitudinally through, and are totally confined within the outer surface of, the insulator body 21. Each passage 22 and 23 receives a portion of an elongated heating coil 25 bent back upon itself to form a pair of leg portions or sections 26 and 27 connected by a bight portion 28 in the front portion of the heating chamber 18. Each leg portion 26 and 27 is preferably fitted tightly within each corresponding passage 22 and 23, so that as much of the coil portions 26 and 27 as possible are in continuous heat conducting relationship with the walls of the passages 22 and 23. It is preferred that only a small portion, namely the bight portion 28 be exposed to radiation directly from the shell 12. The heating coil 25 is preferably made of an elongated coil of electrically conductive wire such as nichrome, of high electrical resistance for generating heat.

In one form of the invention, the insulator body 21 may extend far enough to completely encapsulate or enclose all portions of the heating coil 25, including the bight portion 28.

In the preferred form of the invention, the insulator body 21 is preferably cylindrical and has substantially the same outer diameter as the inner diameter of the cylindrical shell 12 so that the outer surface of the insulator body 21 may be, not only in heat transmitting relationship with the shell 12, but also in direct heat transfer engagement with the shell 12, so that the heat ultimately generated in the insulator body 21 is transferred by conduction to the conductive shell 12.

The rear end of the coil leg portion 27 is coupled by connector 29 to an electrical conductor or wire 30 to one side of a conventional switch 31. The other side of the switch 31 is connected by a supply conductor or wire 32 to the positive side or pole of an electrical voltage source, such as a storage battery 33. The other, or negative, side or pole of the storage battery 33 is connected by a return lead or conductor 34 to a connector 35 coupling the lead 34 to the rear end portion of the coil leg portion 26.

The switch 31 is mounted upon the housing or shell 12 so that the switch button 36 extends through an opening in the wall of the housing 12. The switch button 36 may then be easily manipulated by the hand or finger of the holder of the fishing rod handle 10. The conductors 32 and 34 may extend through a hole 37 in the rear portion of the wall of the shell or housing 12.

Connected across the conductors 30 and 34 is a pilot light 38 in the form of a light emitting diode (LED) 38. The LED 38 extends through a corresponding hole in the wall of the housing 12, as best disclosed in FIG. 1, to illuminate when the switch 31 is closed, and therefore indicate the core 20 is in a heating mode.

The rear end of the housing 12 may be closed by a cap 39, if desired, to permit servicing and maintenance of the parts within the heating chamber 18.

In the operation of the fishing rod handle 10, the handle 10 is initially secured to the fishing rod 11 by fitting the ferrule 14 upon the butt end of the rod 11 and then inserting the ferrule 14 within the bushing 13 secured within the housing 12 by the set screw 15.

When the fisherman desires to use the fishing rod 11, with the handle 10 attached, the leads or conductors 32 and 34 are connected to a conventional storage battery 33 located within the boat in which the fisherman is fishing.

If the fisherman desires to warm his hand holding the handle 10, when the weather is sufficiently cold, he moves the switch button 36 to its closed position to cause current to be supplied from the battery 33 through the supply lead 32, switch 31, conductor 30 and heating coil 25. The circuit is completed from the coil 25 back through the return line 34 to the battery 33.

Because of the high resistance within the insulator body 21, the switch button 36 is left in its closed position for a sufficient time to permit the insulator body 21 to be heated to a sufficiently elevated temperature to transfer just enough heat to the conductive housing 12 to comfortably warm the hand of the fisherman. When this elevated temperature is attained then the switch button 36 is shifted to its open position, cutting off the current from the battery 33 to the heating coil 25 within the heating core 20. Because of the storage capacity of the insulator body 21, residual heat remains within the core 20. After the temperature of the core 20 has dropped to a point where additional heat is desired for warming the hand, the switch button 36 is again shifted to its closed position to re-heat the core 20.

In the actual use of the fishing rod handle 10 made in accordance with this invention, it has been found that the handle 10 may be heated to a comfortable temperature, when the ambient temperature is below freezing, in about 1 minute. This comfortable handle temperature range may be maintained by switching the switch 31 to an "on" position for a few seconds every one to two minutes. Thus, current is drawn from the battery 33 during only a small fraction of the total time that the fishing rod handle 10 is held by the fisherman.

Moreover, the operation of the heated fishing rod handle 10 is not affected in any way by the inclement weather, climate or environment due to wind, or moisture, except in the frequency of manipulation of the switch button 36 because of the differences in heating demand.

In the modification disclosed in FIGS. 4 and 5, an electrically heated handle 40 is fitted over the handle shaft 41 of the head 42 of a trolling motor assembly 43. The head 42 is mounted on the upper end of a vertical shaft 44 journaled in a collar 45 having a clamp 46, or other mounting devices, adapted to fit over the transom of a boat, not shown. The lower end of the shaft 44 is fixed to the submersible trolling motor 47.

The structure of the trolling motor handle member 40 is essentially the same as the fishing rod handle member 10. In the trolling motor handle member 40, an elongated tubular housing 50 of electrically conductive material encloses a heating core 51 identical to the heating core 20. The heating coil 52 within the core 51 is connected to the leads in the supply circuit 54 of the trolling motor assembly 43. One side of the coil 52 is connected through conductor 55 to one side of the switch 56, the other side of which is connected to the supply conductor 57. The other side of the coil 52 is connected through the return conductor 58. Both of the conductors 57 and 58 are connected to the supply circuit 54 in parallel with the circuit to the trolling motor 47.

A pilot light 38 may also be connected across the conductors 55 and 58 to indicate the heating mode of the coil 52.

The handle member 40 is operated in the same manner as the handle member 10 and is adapted to keep warm the hand of the operator of the trolling motor assembly 43 during cold or inclement weather.

The temperature of either of the handles 10 or 40 may be controlled by a timer mechanism, a thermostat, or other type switch, instead of the manually controlled switch 31. Any ofthese switch devices may be located on the handle, in the handle, or apart from the handle 10 or 40.

FIGS. 6-8 illustrate a handle member 60 having a handle housing or shell 62 containing a heating core 20, upon which no switch device of any type is located.

As best illustrated in FIGS. 7 and 8, the butt end of the handle housing 62 is open and provided with an elongated slot 64 for receiving an electrical outlet or receptacle 65 which opens radially outward for receiving the contact prongs 66 of an external electrical connector or plug 67 connected to the end of an electrical cord 68. The cord 68 in turn, is connected into a conventional timer switch device 70 having a rotary timer adjustment dial 71. The timer switch device 70 is supplied with electrical current from a conventional battery 72, similar to the battery 33 (FIG. 2), through an electrical supply circuit 73.

The electrical receptacle 65 is fitted within an insert sleeve 75 which is slip-fitted or force-fitted into the open butt end of the handle housing 62, as illustrated in FIG. 7. The receptacle 65 is electrically connected through electrical lines 76 and 77 to the coils, not shown in FIG. 7, within the heating core 20.

A cap 79 may be fitted over the open butt end of the handle housing 62 to contain the sleeve 75 and receptacle 65 within the handle housing 62. A cover 80 may then be provided around the cap 79 in order to completely seal the interior of the butt end of the handle housing 62 from the weather elements.

FIG. 9 discloses substantially the same device as disclosed in FIGS. 6-8, including a handle housing 62 having the same electrical connection device, including plug 67, and the same weather cover 80. However, the plug 67, is connected to a conventional manual on-off switch 85 in a supply circuit 86 containing a conventional battery 87.

In a device such as that disclosed in FIG. 9, the temperature of the handle member 60 may be predetermined by pre-selecting various electrical components. For example, the heating coil, such as the heating coil 25 illustrated in FIG. 2, may be preselected or pre-sized to have a resistance of a predetermined value and constant temperature.

Also, the device disclosed in FIG. 9 could have a preset maximum constant temperature by the pre-selection of a battery 87 of a certain size or voltage. Once the switch 85 is closed and the constant level temperature achieved in the handle housing 62, then the switch 85 will remain closed as long as the handle member 60 is used, since the maximum constant temperature will be preselected as the desired comfortable temperature level.

By using the detachable electrical plug 67, and an external switch 70 or 85 and an external battery 72 of 87, the handle member 60 may be used by the fisherman in mild or warm weather with the plug 67 detached.

What is claimed is:
1. An electrically heated handle for a fishing rod having a butt end, comprising:
(a) an elongated hollow handle member having a front end portion and a rear end portion and having a thermally conductive shell enclosing an interior chamber,
(b) an elongated heating core having opposite front and rear ends within said chamber,
(c) said heating core comprising an elongated solid insulator body having an outer surface,
(d) said heating core further comprising an elongated electrically conductive heating coil extending longitudinally through, and in heat conductive contact with, the interior of said insulator body,
(e) said entire outer surface of said insulator body being in heat transfer engagement with said shell,
(f) said front end portion of said hollow handle member comprising an elongated socket chamber spaced in front of, and coaxially of, said interior chamber and having an open front end, said socket chamber being adapted to receive and fit over the butt end of a fishing rod,
(g) an electrical voltage source, external to said hollow handle member for supplying current to said heating coil,
(h) switch means for controlling the supply of current to said heating coil,

(i) an electrical conductor within said interior chamber connecting said heating coil and said switch means, and (j) an electrical supply conductor connecting said switch means to said voltage source.

2. The invention according to claim 1 further comprising means for thermally insulating said interior chamber from said socket chamber.

3. The invention according to claim 1 in which said heating coil comprises first and second elongated coil sections extending longitudinally through and within said insulator body, said first and second coil sections being electrically connected at the front end of said heating core, the rear end of said first coil section being connected to said electrical conductor, a return electrical conductor within said interior chamber connected to the rear end of said second coil section and extending through said shell and connected to the other side of said electrical voltage source from said supply conductor.

* * * * *